US006996421B2

(12) United States Patent
Kaegebein

(10) Patent No.: US 6,996,421 B2
(45) **Date of Patent: *Feb. 7, 2006**

(54) ANTENNA/COUPLER ASSEMBLY FOR COAXIAL CABLE

(75) Inventor: Daniel P. Kaegebein, Depew, NY (US)

(73) Assignee: TX RX Systems, Inc., Angola, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,313

(22) Filed: Jul. 30, 2004

(65) Prior Publication Data

US 2005/0009566 A1 Jan. 13, 2005

Related U.S. Application Data

(63) Continuation of application No. 10/346,252, filed on Jan. 17, 2003, now Pat. No. 6,778,845, which is a continuation of application No. 09/352,212, filed on Jul. 13, 1999, now abandoned.

(51) Int. Cl.
*H04B 1/38* (2006.01)

(52) U.S. Cl. .................. 455/562.1; 455/561; 343/790; 343/830; 343/905

(58) Field of Classification Search ............ 455/562.1, 455/561, 575.1, 129, 567, 523; 343/790, 343/830, 905, 791, 739, 906
See application file for complete search history.

(56) References Cited

U.S. PATENT DOCUMENTS

| | | | |
|---|---|---|---|
| 5,061,943 A | 10/1991 | Rammos | |
| 5,124,714 A | 6/1992 | Haranda | |
| 5,404,570 A | 4/1995 | Charas et al. | |
| 5,412,393 A | 5/1995 | Wiggenhorn | |
| 5,565,877 A | 10/1996 | Du et al. | |
| 5,603,080 A | 2/1997 | Kallander et al. | |
| 5,809,429 A | 9/1998 | Knop et al. | |
| 5,926,149 A | 7/1999 | Rummeli et al. | |
| 5,994,977 A | 11/1999 | Taya | |
| 6,195,561 B1 | 2/2001 | Rose | |
| 6,778,845 B2 * | 8/2004 | Kaegebein | 455/562.1 |

* cited by examiner

*Primary Examiner*—Temica Beamer
(74) *Attorney, Agent, or Firm*—Wegman Hessler & Vanderburg

(57) ABSTRACT

A wireless communication system for closed environments including a plurality of antennas parallel line coupled to the coaxial cable of a coaxial cable radio frequency transmission system. Each RF coupler assembly includes a quarter wavelength long conductor positioned between the center and outer conductors of the coaxial cable. The conductor is supported by a conductive bar clamped to the exterior of the coaxial cable, and is axially aligned to the cable and insulated from the center and outer conductors by the cable's dielectric core. The conductor is connected to a radiating or non-radiating element which transfers RF energy between the interior of the coaxial transmission cable to a point at which an antenna or other coaxial cable line can be attached.

31 Claims, 3 Drawing Sheets

FIG. 1
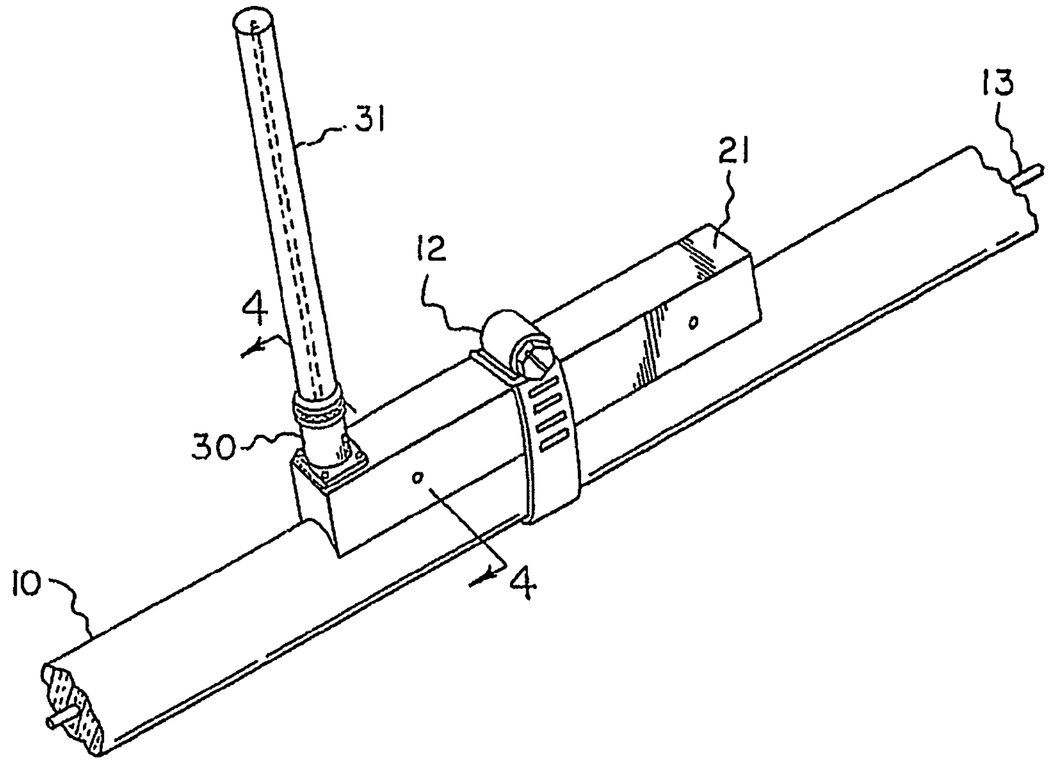
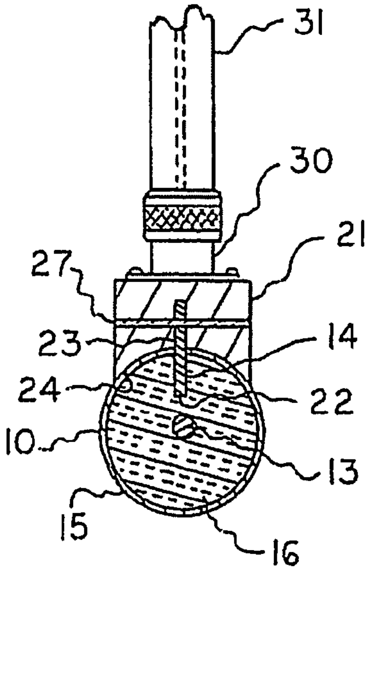
FIG. 4

ANTENNA/COUPLER ASSEMBLY FOR COAXIAL CABLE

CROSS-REFERENCE TO RELATED APPLICATIONS

This is a continuation application of U.S. application Ser. No. 10/346,252 filed Jan. 17, 2003 now U.S. Pat. No. 6,778,845, which is a continuation application of U.S. application Ser. No. 09/352,212, which was abandoned prior to the filing hereof. The disclosures of both of these prior applications are hereby incorporated herein by reference.

BACKGROUND OF THE INVENTION

1. Field of the Invention

The present invention relates generally to a wireless communications enabling system for closed environments. More specifically, the invention relates to a method and apparatus for transferring RF energy between the interior of a coaxial cable and an external antenna.

2. Discussion of the Related Art

Contemporary mobile communication receiver/transmitter units such as found in cellular telephone systems and other types of portable radio telephone systems are able to function only to the extent that the mobile units are able to send and receive radio signals to and from a base station associated with the system. In the real world environment there are impediments to normal radio communication. For example, closed environments such as tunnels, buildings and enclosed shopping malls can attenuate radio signals by as much as 50 dB for small structures and up to total cut-off in the lengthy structures used as underground throughways for trains and road vehicles. The amount of attenuation depends on circumstances, such as the shape of the tunnel or building, and the presence of obstructions like trains or trucks and cars. This attenuation makes radio wave propagation in closed environments erratic and unreliable.

Propagation of radio signals in such closed environments is normally accomplished by propagating a radio frequency signal through either a coaxial or a bifilar conductor located within the closed environment.

Other attempts to radiate radio frequency (FR) power into problematic isolated structures, i.e., closed environments, include the use of a leaky coaxial cable in the structure, and also the brute force approach of directing a large RF power level into the structure from the various repeater locations. However, such approaches have proven to be expensive, prohibitively complicated and difficult-to-impossible to upgrade.

Leaky feeder coaxial cable is commonly used as the antenna to provide portable and mobile two-way radio coverage in enclosed tunnel and tunnel-like confinements. Leaky-feeder cable is a specially designed coaxial cable with slots in the outer shielding conductor which allow a measured amount of RF power which is running through the cable to “leak” out and thus provide a controlled signal environment within a specified distance from the cable. Reciprocity, as applied to an RF signal path, accounts for this same mechanism to couple signals from transmitting devices within this same environment to the leaky feeder cable and from there to associated receiving apparatus.

Leaky feeder manufacturers specify the linear or dielectric loss per unit of length, the same as traditional coaxial cables, and the coupling loss, which is defined as the difference in the RF power level flowing in the cable at any point and the power measured by a standard receiver 20 feet (6 meters) perpendicular to that point. This coupling loss typically ranges from 60 to 80 dB, depending upon the design of the cable. Thus, there is a linear relationship (in dBm) between the power flowing in the cable and the available power to be received by the portable or mobile radio and the power available to the fixed receiving system. Once these maximum signal parameters are determined for a particular system design, the maximum amount of dielectric loss that can be tolerated, and thus the maximum cable length, can be determined.

Common design practice is to place amplifiers at regular intervals along the leaky-feeder system, located at the point in the cable where the RF power reaches the design minimum. The amplifier boosts the signal enough to make up for the dielectric loss expected in the next section of cable, thus making sure that the signal levels never drop below the design minimum. U.S. Pat. Nos. 5,603,080 and 5,404,570 for “Radio Coverage in Closed Environments” issued to S. Kallander and P. Charas are examples of repeater systems.

In many systems, due to physical or other constraints, it is not possible to replace a cable or place an amplifier at the technically required location. In such cases, the signal levels fall below the design requirements and communications is degraded and becomes unusable until the next amplifier is encountered. In public safety and other critical communications systems, areas of degraded communications are not tolerated. A simple way of enhancing this signal is desirable. An effective way is to tap into the cable and place a simple antenna at that location to effectively reduce the coupling loss of the cable at that point. When the signal level within the cable is known, the required distance between these devices can be determined to provide required coverage until the next amplifier is encountered.

In some systems, it is also required to bring coverage into areas adjacent to the leaky-feeder coverage area, but separated by distance or an intervening structure such as a wall. It is then desirable to tap into the leaky-feeder cable in some way to connect another branch feedline and antenna system to cover this adjacent area.

Prior art required cutting the cable, attaching connectors and inserting a coupling component to which an antenna or feedline would be attached. This is time-consuming and expensive and, in the case of a working system, at least part of the system would be out-of-service until the connectors could be attached to the coupling device.

Other prior art obviates the need for cutting the cable and installing connectors, but requires cutting through the leaky-feeder cable dielectric and attaching a device to the center conductor of the cable. This is undesirable for two reasons. First, it allows for the possibility of contaminating the center conductor with the environment into which it is installed. This can cause higher dielectric losses and, depending upon the method of attachment of the device to the center conductor, spurious intermodulation products to be generated. Second, any type of connection to the center conductor of the cable has the potential of causing noise and the creation of intermodulation products, which could cause system signal degradation.

In view of the preceding, due to physical constraints placed on the location of the signal boosters, and the practical limitations on the power output of the booster, it is obvious that a need exists to increase the low level of radiation in radiating coaxial cable systems when the distance between booster amplifiers along a cable is forced to be greater than the usual design parameters dictate. This results in poor or unusable signal levels along a portion of the cable system before the next booster amplifier is reached.

OBJECTIVES OF THE INVENTION

A primary objective of the present invention is to provide a means for increasing the radiation field strength of a radiating coaxial radio frequency transmission medium, to reduce the power output requirement of the in-line signal boosters.

Another objective of the invention is to provide a parallel-coupled line fed antenna for improving the operation of existing radiating coaxial cable networks.

Another primary objective of the present invention is to overcome the physical constraints placed on the location of signal boosters used in coaxial cable communications systems located in closed environments such as the New York City subway system.

Another objective is to provide a coaxial cable communication system for use in closed environments, such as the New York City subway system, which will overcome the practical limitations placed on the output power of boosters used in such systems.

A further objective of the invention is to overcome the physical constraints placed on the location of signal boosters and the limitations placed on the power output of the boosters of existing systems or systems to be installed in environments such as found in the New York City subway tunnels where distances between some subway station platforms is considerable, and the only space available for locating signal boosters is on the subway platforms.

A still further objective of the invention is to increase the low level of radiation in radiating coaxial cable systems when the distance between booster amplifiers along a cable is forced to be greater than the usual design parameters dictate in situations such as found in the New York City subway tunnel system.

A further objective is to overcome poor or unusable signal levels along a portion of the cable system before the next booster amplifier is reached.

A primary purpose of the invention is to couple signals between a radiating cable communication system in a tunnel system, such as the New York City subway system, and portable radios inside subway cars and antennas on the street level to provide two way communications between a central above ground station and portable radios in the subway cars.

A further objective of the invention is to improve the signal level radiated from leaky coaxial cable communications systems by attaching a coupling device to the cable that will bring a higher level signal to a point at which an antenna or other cable distribution means can be attached while experiencing only a small and tolerable insertion loss from the insertion of the coupling device.

A still further objective is to provide multiple coupling devices spaced along a coaxial cable, with improvements in signal level radiated of 15 to 20 dB greater than that typically obtained from a radiating coaxial cable system at comparable distances from the cable.

Another objective is to provide a coupling device that is frequency sensitive in its construction, and can easily be adjusted in length to operate in selected sub-bands from 150 to 1000 MHz.

A still further objective is to provide the exemplary system described herein as the preferred embodiment in terms of a system operating in the UHF band at 400–512 MHz with a coupling level of −10 dB to −11 dB set as the best trade-off between signal level obtained and cable insertion loss experienced, namely about 0.5 dB.

A primary objective of the present invention is to provide a means for increasing the radiation field strength of a coaxial radio frequency transmission medium increase in signal without requiring an input strength or the use of repeaters.

Another objective of the invention is to provide a parallel-coupled line fed antenna for improving the operation of existing radiating coaxial cable networks.

A further objective of the invention is to enhance the operation of existing radiating coaxial cable networks to enable them to function as part of digital communication networks.

A still further objective is to provide radio frequency antennas for coaxial cable signal transmission networks that may be installed in existing cables without splicing.

Another objective of the invention is to increase the level of RF signals radiated into closed environments such as the New York City subway system.

A further objective of the invention is to couple RF energy into and out of a radiating or non-radiating cable system without making a metal-to-metal contact with either the inner or outer conductor of the cable.

A still further objective of the invention is to provide a means for eliminating the need for additional in-line signal boosters in radiating coaxial cable radio frequency transmission networks, when the goal is to limit the signal booster output power, resulting in lower costs and more manageable undesirable intermodulation products.

Another objective is to eliminate intermodulation as can be produced by poor or time degrading mechanical contacts between coupler and cable metallic joints.

Another objective is to provide a coupling means that can easily be relocated along a cable system without comprising coaxial cable transmission parameters.

SUMMARY OF THE INVENTION

The invention employs a means for coupling energy into and out of a radiating or non-radiating coaxial cable. It is comprised of an unterminated conductor positioned within the dielectric of a coaxial cable in close proximity and parallel to the center conductor. The unterminated conductor is insulated from the center conductor and the outer conductor of the coaxial cable. In one embodiment, it is electrically connected to a quarter wave antenna on a quarter wave conductive bar and co-acting resonator, which radiates radio frequency signals transmitted over the coaxial cable into the immediately adjacent closed space. The system is a parallel-coupled line fed antenna, deriving its radiated signals and relaying received signals from/into a coaxial cable transmission system. It provides increased signal strength and reduces the need for signal boosters in long cable runs.

BRIEF DESCRIPTION OF THE DRAWINGS

FIG. 1 is a perspective view of the signal-coupling device of the present invention installed on a coaxial cable;

FIG. 4 is a sectional view of the signal-coupling device installed on a coaxial cable taken along the line A—A of FIG. 1.

DESCRIPTION OF THE PREFERRED EMBODIMENTS

Figure 2:
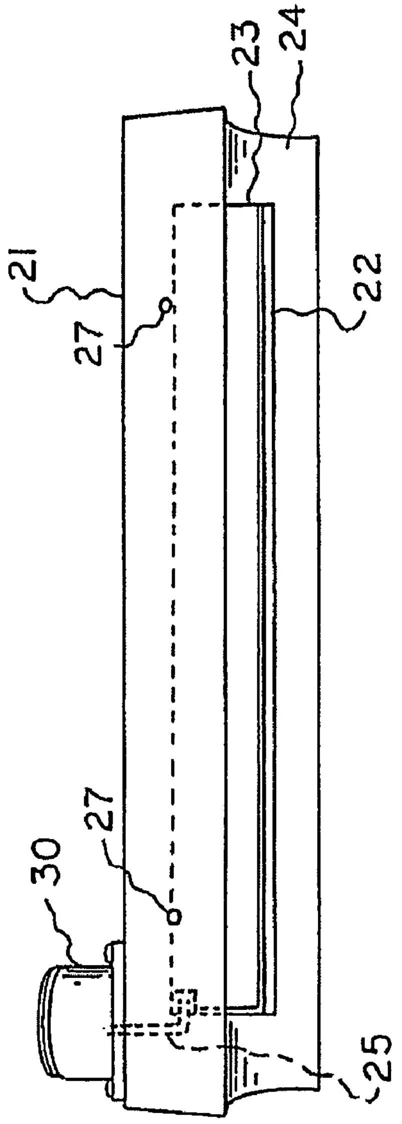
FIG. 2 is a perspective view of the underside of the signal-coupling device illustrating the printed circuit board which fits into a milled slot in a coaxial cable.

FIG. 1 illustrates the antenna assembly of the invention installed on a section of coaxial cable which is part of a coaxial cable radio frequency transmission line extending into a closed environment. The coaxial cable radio frequency transmission line is connected at one end to a base station or off-the-air signal source, as a signal booster/antenna system, and supports a plurality of antenna assembly units. The antenna assembly units operate as parallel coupled line driven antennas in a system wherein the primary antenna is the radiating coaxial cable RF transmission network. This parallel coupled line antenna system incorporates an attachment means, which also acts as a co-acting resonator in the form of a conductive bar 21 which is a quarter wavelength long at the system's operating frequency. The conductive bar is fabricated from aluminum in preferred embodiments. It is held on the coaxial cable 10 by a clamping device such as a stainless steel strap clamp 12. The bar's primary functions are to position an unterminated conductor 22 adjacent to the center conductor 13 of the coaxial cable 10, and to co-act in resonance with the quarter wave antenna 31, as best seen in FIG. 4. The unterminated conductor 22 is a conductive strip, concaved underside 24 of the conductive bar 21. The conductive strip is less than a quarter wavelength long at the system's optimum operating frequency because the connecting wire 25, from the center conductor of the coaxial conductor 30, adds length, and the dielectric material of the circuit board 23, plus the dielectric in the cable slot makes the physical length greater than a quarter wavelength. However, the effective electrical length is closer to a quarter wavelength, see FIG. 2. In actual practice, the length is set experimentally. The quarter wave antenna, radiating element 31, is placed on the connector, and the length of the conductor on the circuit board is set so that the bandwidth of the maximum insertion loss effect in the coaxial cable is centered at the frequency co-incident with the desired operating bandwidth. The insertion loss detected in the coaxial cable is an indication that the energy is being coupled out of the cable at the desired frequency.

Figure 3:
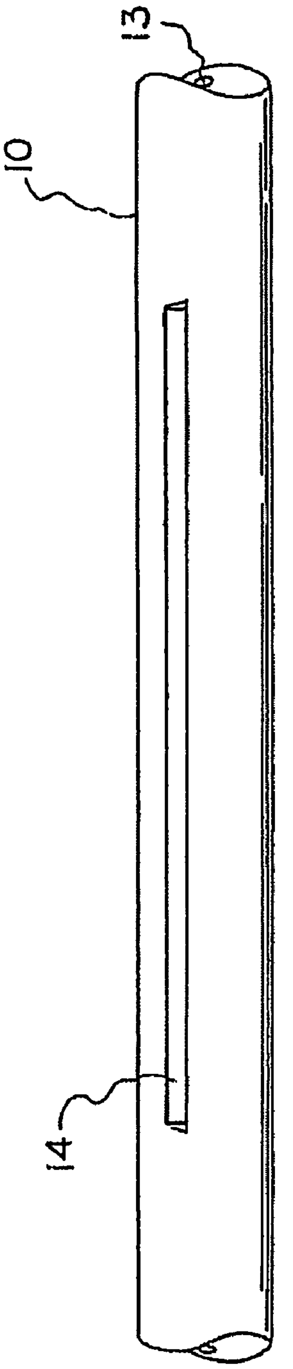
FIG. 3 illustrates a section of coaxial cable prepared to receive the parallel-coupled line element of the present invention.

The coaxial connector is secured to the topside of the conductive bar 21 by screws 27. The curvature of the underside 24 of the conductive block is dimensioned to match the curvature of the exterior of coaxial cable 10 so that when assembled, it acts as a protective shield preventing physical contaminants from entering slot 14, see FIG. 3.

The coaxial cable used as the coaxial cable radio frequency transmission line has a center conductor encased by a dielectric body which is surrounded by an outer conductor. The bar 21 is insulated from the outer conductor of the coaxial cable by the cable's insulating jacket. If the coaxial cable has no external insulating jacket an insulating layer is positioned between the outer conductor and the underside of the bar. The shielding provided by the outer conductor of the coaxial cable remains intact, with the exception of slot 14 which is covered by conductive bar 21.

The slot 14, in the cable is cut by a routing or milling process through the outer covering and outer conductor 15 of the cable and into dielectric 16 to within close proximity of center conductor 13, as illustrated in FIG. 4, so that when assembled as illustrated in FIG. 1, the antenna 31 will exchange RF energy between the coaxial cable 10 and the surrounding atmosphere.

The antenna 31 may be a specially constructed quarter wavelength antenna, but in a preferred embodiment, it is a section of coaxial cable a quarter wavelength long at its optimum operating frequency with a connector at one end and its outer conductor removed. The dielectric surrounding the center conductor is retained to provide support and protection for the quarter wavelength center conductor.

Figure 5:
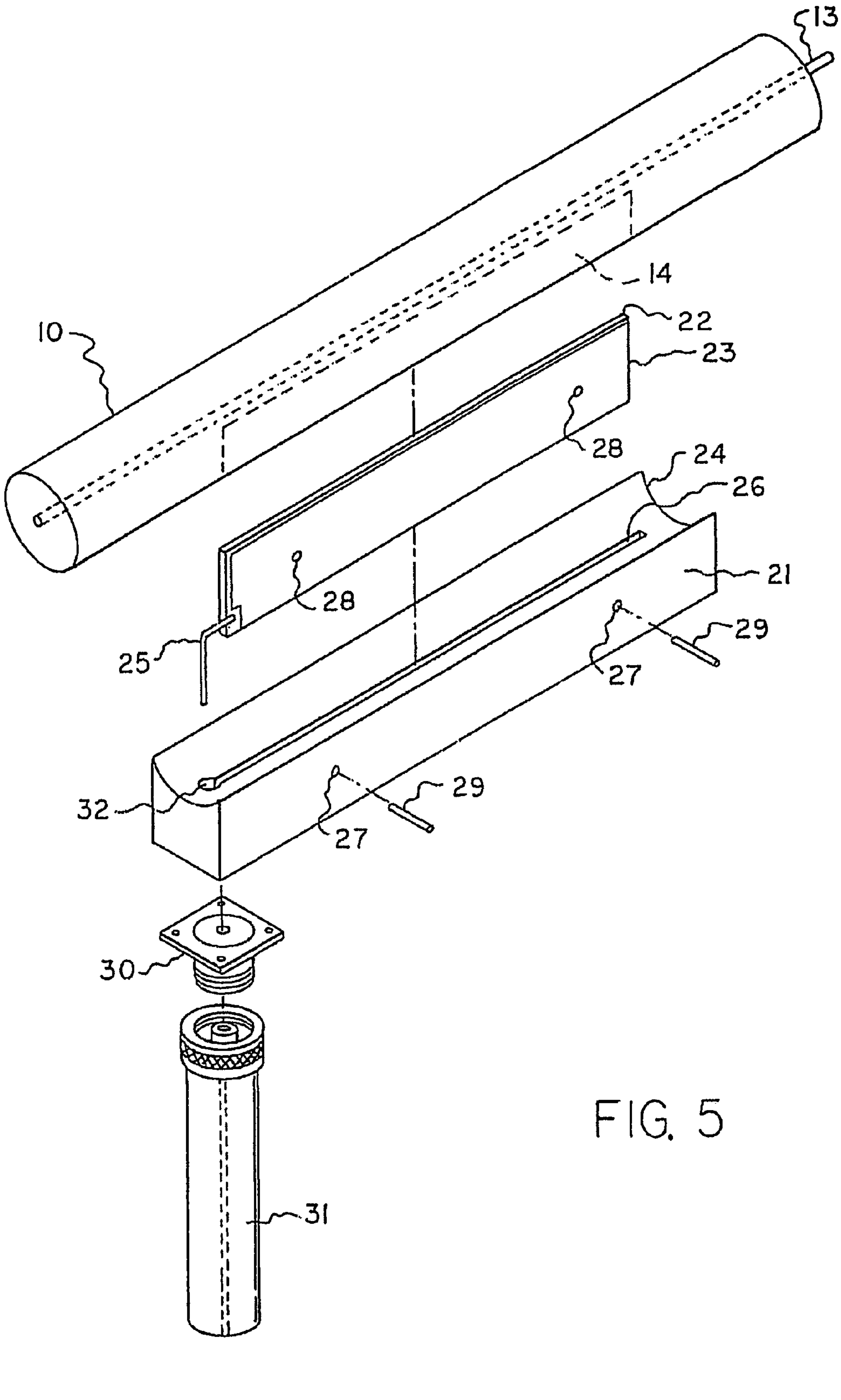
FIG. 5 is an exploded view of the present invention.

The details of the construction of the invention may best be seen in the exploded view of FIG. 5. The body of the antenna unit, the conductive bar 21, is preferably fabricated from aluminum. It is generally rectangular in shape both linearly and in cross section with all sides flat except one. That side, the underside 24, is concave to match the exterior surface of the coaxial cable the bar is designed to be coupled to.

A slot 26 is milled longitudinally along the length of the block, penetrating from the center of the concave surface along the longitudinal axis of the bar. This slot is dimensioned to receive a standoff, for example a printed circuit board 23, which is approximately a quarter wavelength long to support conductive strip 22. The slot 26 is milled to a depth such that when the printed circuit board 23 is secured in the slot and the bar 21 is clamped on the coaxial cable, the portion of the board protruding above the concave surface will hold the conductive strip within the slot 14 in the cable between the cable's center and outer conductors and in close proximity to the center conductor 13. Two or more holes 27 are bored through the block in the position illustrated in FIGS. 4 and 10 to match holes 28 bored through the printed circuit board 23. When the board 23 is in place, pins 29 are driven through the holes 27 and 28 to lock the printed circuit board in position. A hole 32 is bored completely through the block at one end of the slot 26 so that the center conductor 25 of the coaxial connector 30 can be connected to the conductive strip 22 without shortening the strip to the ground plane bar 21.

The device couples RF energy into or out of the radiating coaxial cable at a level which is 11 to 12 dB below the level of RF energy present in the coaxial cable, and which may be traveling in opposite directions. The device couples energy out of or into the cable by the unterminated conductor 22, which is about a quarter wavelength long and functions as a parallel-coupled line element with respect to the cable 10. It is located in close proximity to the center 20 conductor 13 of the coaxial cable. The unterminated conductor 22 is printed on the edge of a circuit board substrate. The circuit board is secured to the conductive bar 21 which is slightly longer than a quarter wave and dimensioned to match the outer circumference of the coaxial cable and cover about one-third of the cable's circumference. It completely covers the slot 14 cut by a routing process into the cable. The slot in the cable is cut to a depth so that it terminates slightly above the cable center conductor, leaving a segment of dielectric between the center conductor and unterminated conductor 22 when the device is assembled. The slot in the cable may be created by a fixture comprised of a template clamped to the coaxial cable and designed to guide a router bit driven by a small drill motor.

The length of the conductive bar, 21 and the radiating section of open circuited modified cable are about a half wavelength, the minimum required for a resonant condition. The unterminated printed circuit conductor 22 adjacent to the center conductor 13 of the coaxial cable couples RF signal from the center conductor to the resonant assembly comprised of the conductive bar 21 and open circuited modified cable 31 at about the midpoint of this half wavelength emulating pair, similar to a dipole, passing RF energy freely back and forth to and from the halfway resonant assembly.

Because the resonant assembly is decoupled from the main line, it is not necessary for the radiator 31 to have an impedance of 50 ohms. It is excited by a standing wave due to its resonant length. Antennas that are of 50-ohm impedance may be connected to the connector on the conductive bar and they will respond similarly to the modified cable segment 31.

This parallel line coupled antenna operates over a bandwidth of frequencies with the characteristics of a dipole assembly. It responds well over a bandwidth equal to 20 percent of the main operating frequency.

A typical coaxial cable transmission network has a coupling factor of −68 dB at 20 feet from the cable. When operated in the UHF band at 450 MHz, the free space propagation attenuation is about −42 dB 20 feet from the cable. In a worst case situation, the parallel line coupled antenna system of the present invention has a −11 dB coupling factor, providing a net −53 dB decoupled level at 20 feet from the cable. This represents a 15 dB improvement.

To raise the power level of RF signals by an amount equal to the 15 dB improvement requires a power level increase of 30 times, i.e., going from 1 watt to 30 watts. To do this for 9 or 10 frequencies while maintaining low intermodulation levels would be an extremely costly endeavor. Therefore, improving the radiating efficiency by 15 dB is a much simpler and cost-effective solution.

One of the problems overcome by the system relates to its installation in existing radiating coaxial cables. Coaxial cables used for signal distribution systems are very rigid, and attempting to cut into such cables to install the coupling assembly has proven to be impractical, especially in tunnels with limited access and subway cars passing in close proximity to the workstation. This was overcome by fabricating a holder/guide for a small drill motor with means to clamp the guide to a cable to be modified. Using a conventional cutting burr set in the drill motor chuck to allow a predetermined depth of cut, a slot of required dimensions is easily milled or routed in the cable. After the slot is created, compressed air is used to blow the slot clean. This creates a slot formed in the coaxial cable as an excised area of the dielectric body in a radial direction from the body's outer surface toward the center conductor, leaving a layer of dielectric material covering the center conductor at the bottom of said excised area. The process of routing the dielectric body simultaneously creates a longitudinal opening in the outer conductor coincident with the excised area of the dielectric body.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. An antenna/coupler assembly for a coaxial cable having an outer insulating layer, a center conductor, an outer conductor, a dielectric body encasing said inner conductor, and a first slot formed in said coaxial cable, said first slot extending through said outer insulating layer, said outer conductor, and partially through said dielectric body radially inwardly from said outer insulating layer toward said inner conductor, and said first slot having an inner edge arranged to extend longitudinally parallel and proximate to said inner conductor; said assembly comprising:

a conductive bar having a second slot; said conductive bar adapted to be coupled to said coaxial cable to position said second slot in radial alignment with said first slot;

a radiating element connected to said conductive bar; and an unterminated conductor positioned within said second slot in electrical contact with said radiating element, said unterminated conductor operatively arranged to be electromagnetically coupled to said center conductor when said conductive bar is coupled to said coaxial cable.

2. The antenna/coupler assembly recited in claim 1, wherein said conductive bar includes a concave surface arranged to mate with an outer surface of said coaxial cable.

3. The antenna/coupler assembly recited in claim 1 further comprising a standoff extending from a bottom surface of said conductive bar into said first slot of said coaxial cable for supporting said unterminated conductor in a plane parallel to said center conductor and said conductive bar at a predetermined distance from said center conductor and said conductive bar.

4. The antenna/coupler assembly recited in claim 1 wherein said radiating element includes a connection end and a free end, and said connection end is connected to said conductive bar.

5. The antenna/coupler assembly recited in claim 3 wherein said standoff is a printed circuit board and said unterminated conductor is a metal foil secured along one edge of said printed circuit board.

6. The antenna/coupler assembly recited in claim 1 wherein said conductive bar is co-resonant with said radiating element.

7. The antenna/coupler assembly recited in claim 5, further comprising a clamp for holding a concave bottom surface of said conductive bar against an insulating outer surface of said coaxial cable whereby said standoff positions said unterminated conductor between said center conductor of said coaxial cable and said outer conductor of said coaxial cable.

8. The antenna/coupler assembly recited in claim 1 wherein said conductive bar is operatively arranged to effect half wave resonance with said radiating element.

9. The antenna/coupler assembly recited in claim 1 wherein said radiating element is arranged to be perpendicular to a top surface of said conductive bar.

10. The antenna/coupler assembly recited in claim 1 wherein said unterminated conductor is about a quarter wavelength long at its optimum frequency, said radiating element is about a quarter wavelength long at its optimum operating frequency and said conductive bar is about a quarter wavelength long at its optimum operating frequency.

11. An antenna system, comprising:

a first conductor;

a conductive bar including a bottom surface;

means extending from said bottom surface of said conductive bar for supporting said first conductor in a plane parallel to said conductive bar and the center conductor of a coaxial cable at a predetermined distance from said bottom surface of said conductive bar and within the circumference of the outer conductor of said coaxial cable;

a radiating element including a connection end and a free end, and said connection end is connected to said conductive bar; and means for connecting said first conductor to said connection end of said radiating element.

12. An antenna system as recited in claim 11, wherein said means for supporting said first conductor in a plane parallel to said center conductor is a printed circuit board and said first conductor is a metal foil secured along one edge of said printed circuit board.

13. An antenna system as recited in claim 12, wherein said conductive bar bottom surface is concave to match the outer surface of a coaxial cable.

14. An antenna system as recited in claim 13, wherein said means for supporting said first conductor in a plane parallel to said center conductor is dimensioned to position said first conductor between the center conductor and outer conductor of a coaxial cable when said concave bottom surface of said conductive bar is clamped against the outer surface of said coaxial cable.

15. An antenna system as recited in claim 14, wherein said conductive bar is in co-acting resonance with said radiating element.

16. An antenna system as recited in claim 15, wherein said radiating element is perpendicular to a top surface of said conductive bar.

17. An antenna system as recited in claim 16, wherein said first conductor is a less than a quarter wavelength long at the antenna systems optimum operating frequency.

18. An antenna system as recited in claim 17, wherein said conductive bar is about a quarter wavelength long at its optimum operating frequency.

19. An antenna system as recited in claim 18, wherein said radiating element is about a quarter wavelength long at its optimum operating frequency.

20. A wireless communication system for closed environments, comprising:

a coaxial cable radio frequency transmission line extending at least partially through said closed environment and connected at one end to an RF signal source;

said coaxial cable radio frequency transmission line includes a coaxial cable comprising, a center conductor, a dielectric body encasing said center conductor, and an outer conductor surrounding said dielectric body;

a slot formed in said coaxial cable;

said slot including an excised area of said dielectric body which has been excised in a radial direction from the outer surface of said dielectric body toward said center conductor, leaving a layer of dielectric material covering said center conductor at the bottom of said excised area;

a longitudinal opening in said outer conductor coincident with said excised area of said dielectric body;

a first conductor about a quarter wavelength long at its optimum operating frequency positioned in said slot formed in said coaxial cable;

a conductive bar about a quarter wavelength long at its optimum operating frequency including a top and a bottom surface covering said longitudinal opening in said outer conductor coincident with said excised area of said dielectric body;

a printed circuit board extending from said bottom surface of said conductive bar into said slot formed in said coaxial cable for supporting said first conductor in a plane parallel to said center conductor and said conductive bar at a predetermined distance from said center conductor and said conductive bar;

said first conductor is a metal foil secured along one edge of said printed circuit board;

a radiating element about a quarter wavelength long at its optimum operating frequency including a connection end and a free end, and said connection end is connected to said conductive bar;

means for connecting said first conductor to said connection end of said radiating element;

said conductive bar is in co-acting resonance with said radiating element and said bottom surface is concave to match the outer surface of said coaxial cable;

a clamp for holding said concave bottom surface of said conductive bar against an outer insulated surface of said coaxial cable whereby said printed circuit board positions said first conductor between said center conductor and said outer conductor of said coaxial cable; and said radiating element is perpendicular to said top surface of said conductive bar.

21. An RF coupler assembly for a first coaxial cable, said first coaxial cable having an outer insulating layer, a center conductor, an outer conductor, a dielectric body encasing said inner conductor, and a first slot formed in said first coaxial cable, said first slot extending through said outer insulating layer, said outer conductor, and partially through said dielectric body radially inwardly from said outer insulating layer toward said inner conductor, and said first slot having an inner edge arranged to extend longitudinally parallel and proximate to said inner conductor; said assembly comprising:

a conductive bar having a second slot; said conductive bar adapted to be coupled to said first coaxial cable to position said second slot in radial alignment with said first slot;

a radiating or non-radiating second coaxial cable connected to said conductive bar; and an unterminated conductor positioned within said second slot in electrical contact with said second coaxial cable, said unterminated conductor operatively arranged to be electromagnetically coupled to said center conductor when said conductive bar is coupled to said first coaxial cable.

22. The RF coupler assembly as recited in claim 21, wherein said second coaxial cable includes a connection end and a free end, and said connection end is connected to said conductive bar.

23. The RF coupler assembly as recited in claim 22, wherein a radiating element is connected to said free end of said second coaxial cable.

24. The RF coupler assembly recited in claim 21, wherein said conductive bar includes a concave surface arranged to mate with an outer surface of said first coaxial cable.

25. The RF coupler assembly recited in claim 24 further comprising a standoff extending from a bottom surface of said conductive bar into said first slot of said first coaxial cable for supporting said unterminated conductor in a plane parallel to said center conductor and said conductive bar at a predetermined distance from said center conductor and said conductive bar.

26. The RF coupler assembly recited in claim 25 wherein said standoff is a printed circuit board and said unterminated conductor is a metal foil secured along one edge of said printed circuit board.

27. The RF coupler assembly recited in claim 26, further comprising a clamp for holding a concave bottom surface of said conductive bar against an insulating outer surface of said first coaxial cable whereby said standoff positions said unterminated conductor between said center conductor of said first coaxial cable and said outer conductor of said first coaxial cable.

28. A wireless communication system for closed environments, comprising:

a coaxial cable radio frequency transmission line extending at least partially through said closed environment and connected at one end to an RF signal source;

said coaxial cable radio frequency transmission line includes a coaxial cable comprising, a center conductor, a dielectric body encasing said center conductor, and an outer conductor surrounding said dielectric body;

a slot formed in said coaxial cable;

said slot including an excised area of said dielectric body which has been excised in a radial direction from the outer surface of said dielectric body toward said center conductor, leaving a layer of dielectric material covering said center conductor at the bottom of said excised area;

a longitudinal opening in said outer conductor coincident with said excised area of said dielectric body;

a first conductor about a quarter wavelength long at its optimum operating frequency positioned in said slot formed in said coaxial cable;

a conductive bar about a quarter wavelength long at its optimum operating frequency including a bottom surface covering said longitudinal opening in said outer conductor coincident with said excised area of said dielectric body;

a standoff extending from said bottom surface of said conductive bar into said slot formed in said coaxial cable for supporting said first conductor in a plane parallel to said center conductor and said conductive bar at a predetermined distance from said center conductor and said conductive bar;

a radiating element about a quarter wavelength long at its optimum operating frequency including a connection end and a free end, and said connection end is connected to said conductive bar;

means for connecting said first conductor to said connection end of said radiating element;

said conductive bar is in co-acting resonance with said radiating element and said bottom surface is concave to match the outer surface of said coaxial cable;

a clamp for holding said concave bottom surface of said conductive bar against an outer insulated surface of said coaxial cable whereby said standoff positions said first conductor between said center conductor and said outer conductor of said coaxial cable.

29. The communication system as recited in claim 28, wherein said standoff is a printed circuit board.

30. The communication system as recited in claim 29, wherein said first conductor is a metal foil secured along one edge of said printed circuit board.

31. The communication system as recited in claim 30, wherein said radiating element is perpendicular to a top surface of said conductive bar.

* * * * *